United States Patent [19]

Smith

[11] 4,119,944
[45] Oct. 10, 1978

[54] VEHICULAR TIRE AIR PRESSURE MEASURING SYSTEM

[76] Inventor: Jesse Britton Smith, 1153 Rock Creek Dr., Garland, Tex. 75040

[21] Appl. No.: 810,160

[22] Filed: Jun. 27, 1977

[51] Int. Cl.² ............................................. B60C 23/02
[52] U.S. Cl. ..................................... 340/58; 73/146.5
[58] Field of Search ............ 340/58; 200/61.22, 61.25; 73/146.2, 146.4, 146.5, 146.8

[56] References Cited

U.S. PATENT DOCUMENTS

| 3,588,814 | 6/1971 | Furlong | 340/58 |
| 3,707,701 | 12/1972 | Neu | 340/58 |

Primary Examiner—Alvin H. Waring
Attorney, Agent, or Firm—Albert C. Metrailer

[57] ABSTRACT

A system for measuring the pressure of air in the tires of a moving vehicle including a wheel mounted transducer, a chassis mounted sensor, and a chassis mounted electronic processing unit for converting sensor signals to tire pressure indications. The transducer includes two fixed magnetic elements and a movable magnetic element positioned between the fixed elements. Tire air pressure moves the movable element against a spring so that its position indicates the pressure. The sensor generates a signal each time a magnetic element passes by it and these signals are coupled to the processing unit. The processing unit measures the time intervals between the passage of the first and second fixed element and calculates pressure from the ratio of time periods. The ratio makes the pressure calculation independent of vehicle speed. The processing unit also multiplexes the outputs of multiple sensors to provide sequential readout of tire pressures and locations.

5 Claims, 7 Drawing Figures

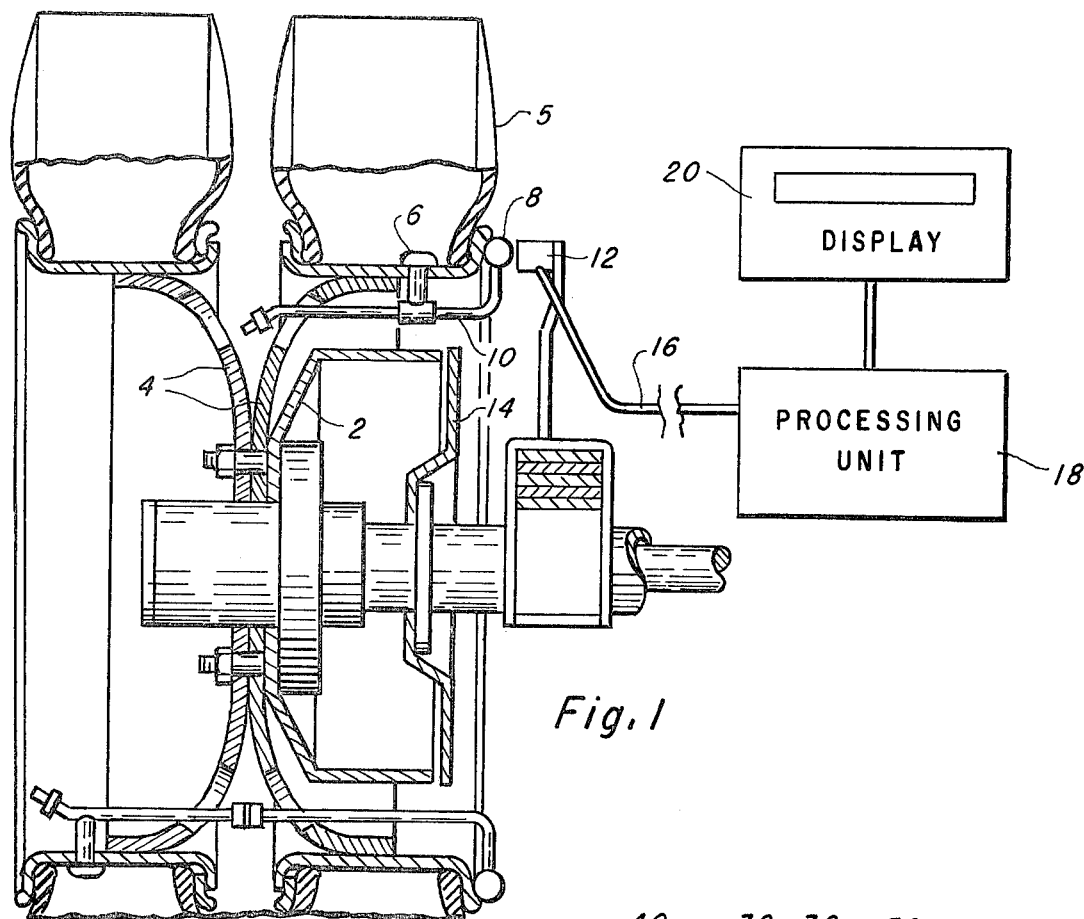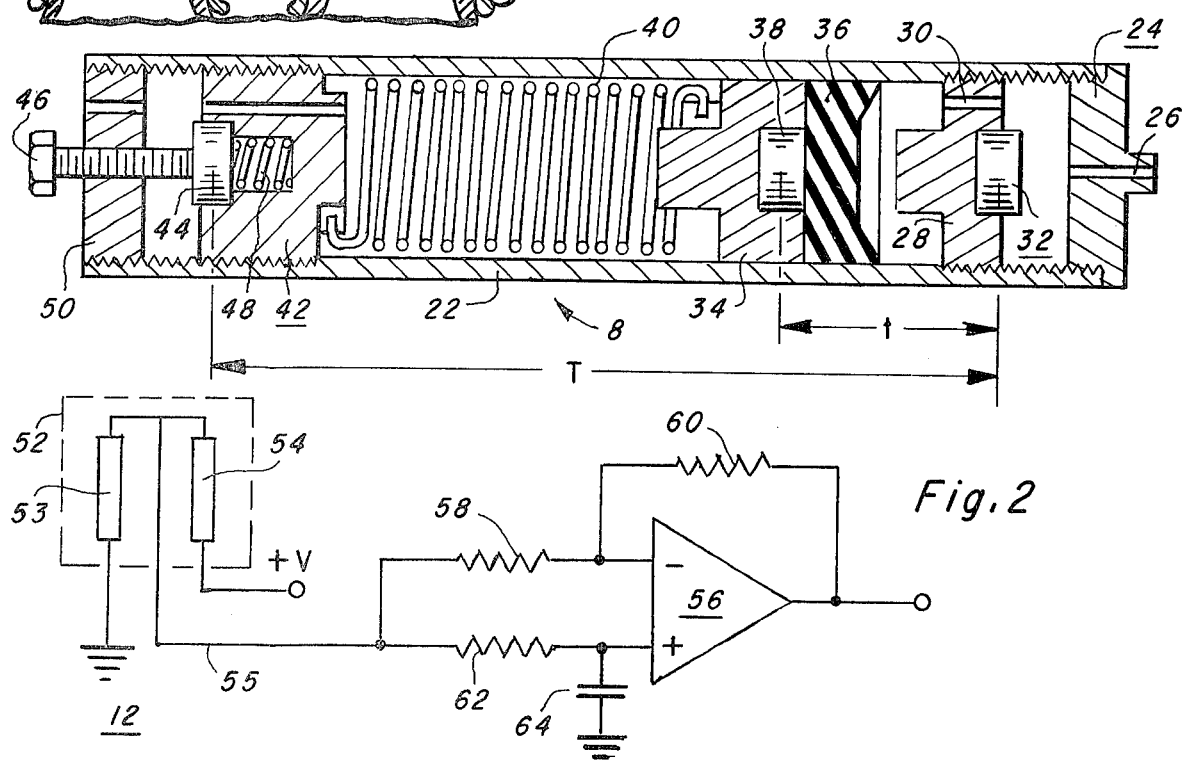
Fig. 1
Fig. 2

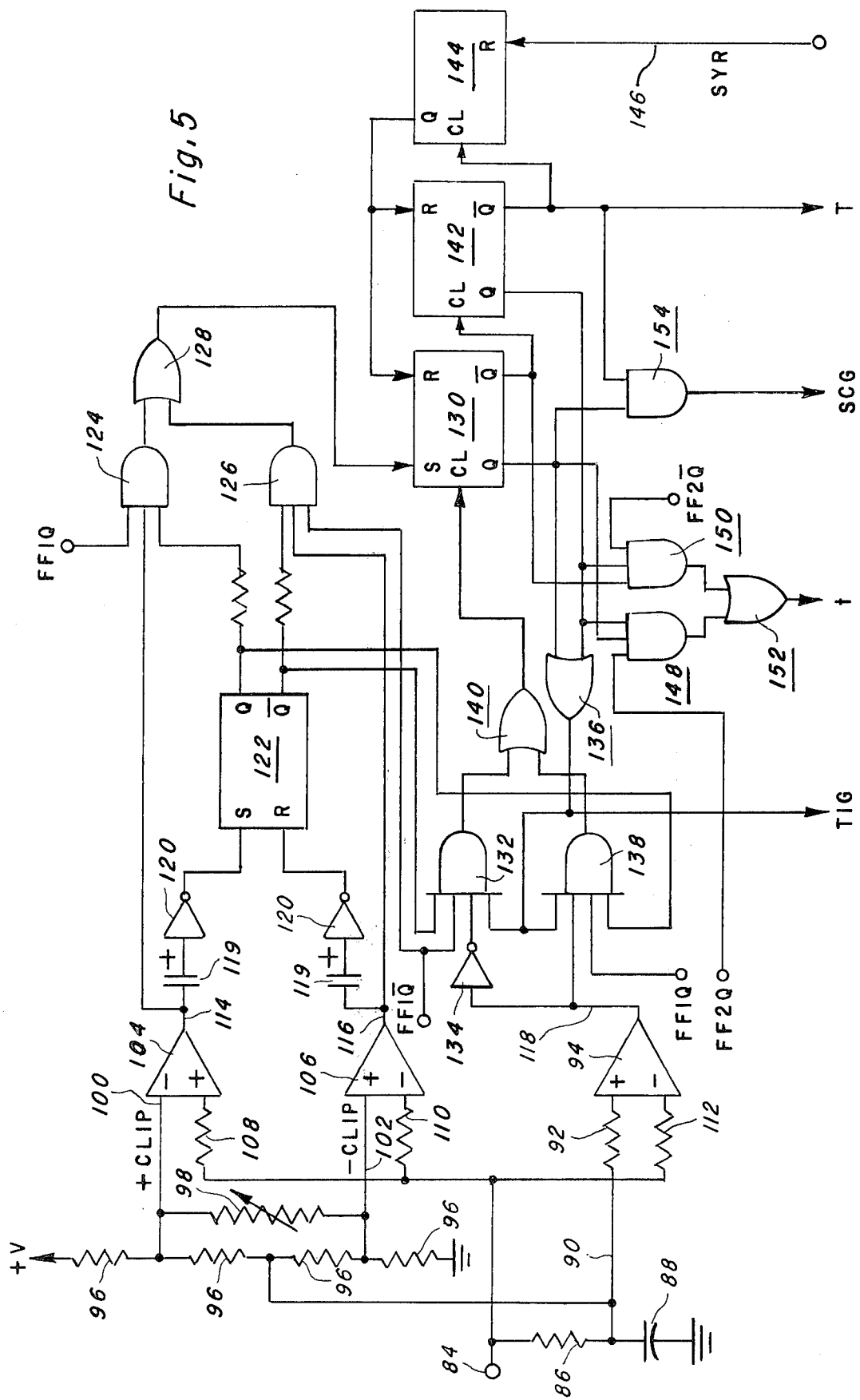

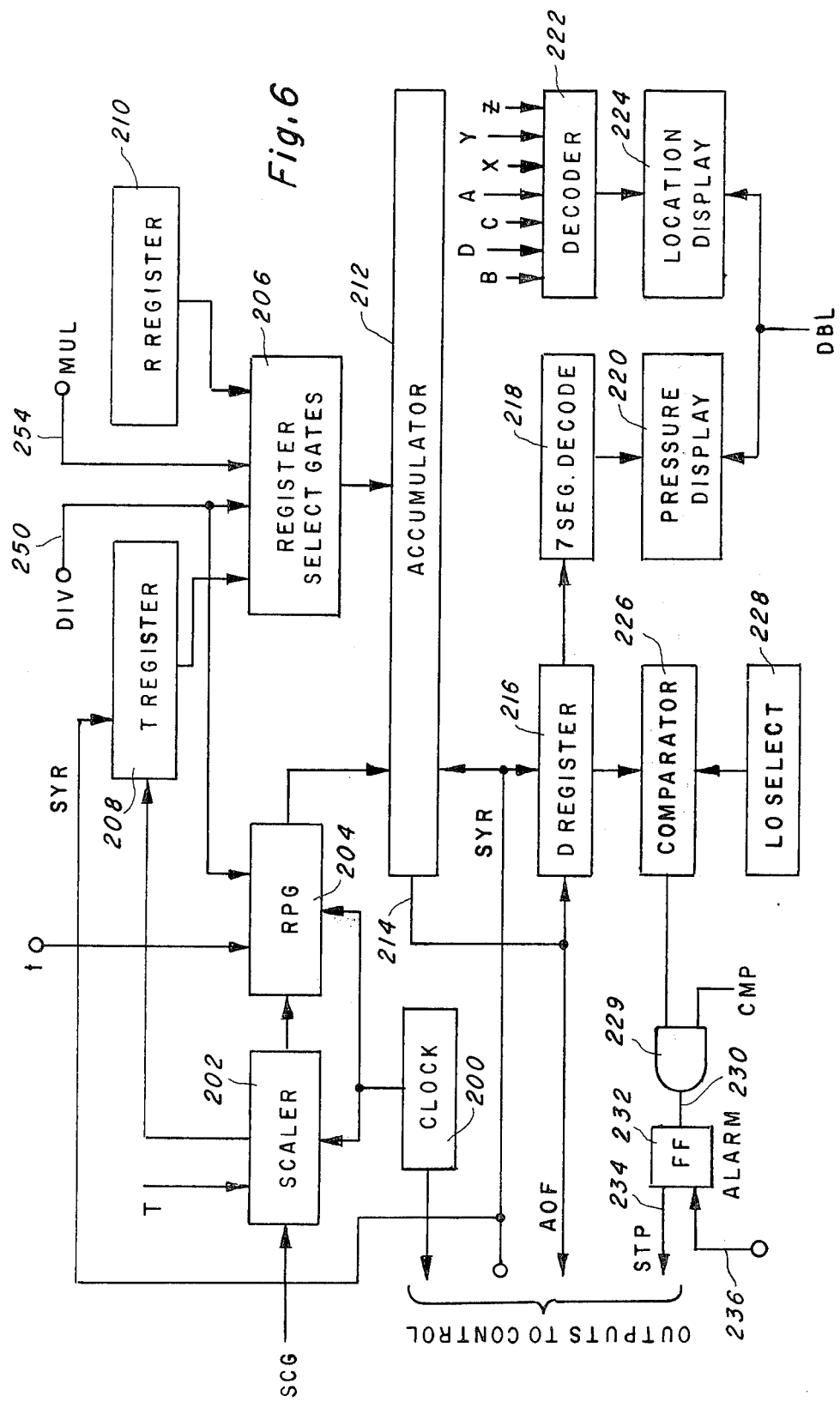

VEHICULAR TIRE AIR PRESSURE MEASURING SYSTEM

BACKGROUND OF THE INVENTION

This invention relates to systems for measurement and indication of vehicular tire air pressure and more particularly for measurement of tire pressure in a moving vehicle.

The importance of maintaining proper air pressure in pneumatic tires for both safety and financial reasons has long been recognized. Tire pressure can be checked manually when a vehicle is stopped, but on some vehicles, such as multi-axle transport trucks, manual checking can be quite time consuming. Many tire failures begin while a vehicle is in motion and it is important for the driver to know of a slow loss of pressure before the tire becomes dangerously deflated. Many tire pressure warning systems have been devised and patented, but most only warn of loss of pressure below a fixed threshold or require complex and unreliable commutating elements to be built into an axle. Some threshold sensing devices such as that disclosed in U.S. Pat. No. 2,710,391 issued to F. Trinca on June 7, 1955, have a mechanical finger which extends from a wheel mounted sensor upon a loss of pressure to move the arm of a chassis mounted switch on each tire revolution. Other threshold sensing devices, such as that disclosed in U.S. Pat. No. 3,638,180 issued to Daniel Lejeune on Jan. 25, 1972, have a magnet which moves upon a loss of pressure to cause a reed switch to close each time the sensor passes. In some warning systems such as that disclosed in U.S. Pat. No. 3,162,835 issued to W. H. Dudar on Dec. 22, 1964, a wheel mounted pressure sensor is coupled to a chassis mounted annunciator by means of a slip ring built into an axle. Still other sensing systems, such as that disclosed in U.S. Pat. No. 3,215,978, issued to H. M. Brown et al on Nov. 2, 1965 include a radio frequency transmitter mounted on each wheel in addition to a pressure sensing switch which activates the transmitter upon a loss of tire pressure. In this system a chassis mounted receiver detects the signal and generates a warning for the driver. The systems characterized by slip ring contacts or radio transmitters could be modified to include actual pressure measuring sensors, but at the cost of increased complexity of the wheel sensor and the requirement that power must be supplied to the wheel mounted sensor. The above referenced Brown patent discloses a battery powered transmitter, but it only operates when a failure occurs, and more power would be required for continuous operation. All the other systems are limited to pressure threshold sensing and not actual pressure measuring.

SUMMARY OF THE INVENTION

Accordingly an object of the present invention is to provide an improved pneumatic tire pressure measuring system.

Another object of the present invention is to provide a system for measuring the pressure of tires on a moving vehicle and providing a linear indication of that pressure to the vehicle driver.

Another object of the present invention is to provide a simple and reliable vehicular tire pressure measuring system.

These and other objects of the present invention are achieved by providing a pressure measuring system comprising a wheel mounted pressure transducer, a chassis mounted sensor, and a chassis mounted electronic processing unit for receiving sensor signals and generating an output indicative of tire pressure. The pressure transducer includes a tubular housing having first and second magnetic elements fixed to each end thereof and a third element fixed to an air tight piston which is slidably positioned within the housing. One end of the housing is in communication with the tire to apply tire air pressure to one side of the piston, and a spring between the piston and the other end of the housing resists piston movement. The housing is mounted on the tire so that as the wheel turns the three magnetic elements move past the chassis mounted sensor sequentially. The processing unit responds to the sensor outputs to measure the time intervals between the passage of the first and second elements, and between the passage of the first or second elements and the third element, and then calculates tire pressure from the ratio of the time periods.

BRIEF DESCRIPTION OF THE DRAWINGS

The present invention may be more fully understood by reading the following detailed description of the preferred embodiment with reference to the accompanying drawings wherein:

FIG. 1 is a cross sectional illustration of the positioning of a transducer and sensor on a vehicle wheel and block diagram of its interconnection to a processing unit and display;

FIG. 2 is a cross sectional view of a transducer according to the present invention and a schematic diagram of a sensor and its buffer amplifier, illustrating the positioning of the transducer relative to the sensor;

FIG. 5 is a schematic and logic diagram of circuitry for detecting and sampling the outputs of sensors;

FIG. 6 is a block diagram of an arithmetic unit for calculating and displaying pressure measurements; and, FIG. 7 is a block diagram of system control units.

DESCRIPTION OF THE PREFERRED EMBODIMENT

Figure 3:
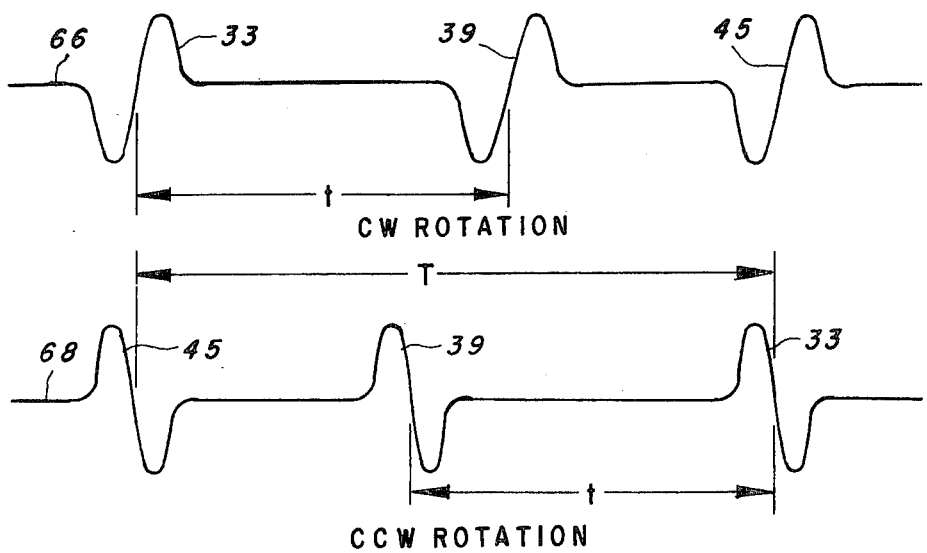
FIG. 3 illustrates output signals generated by a sensor.

With reference now to FIG. 1 there is illustrated a cross section of part of a vehicle brake drum 2, a wheel rim 4 and tire 5. The rim 4 has a standard tire valve stem 6 for filling the tire 5 with air. A pressure transducer 8 is attached to the vehicle side of rim 4 and connected to the valve stem 6 by a tube 10 which places a portion of transducer 8 in communication with the inner volume of the tire 5. A sensor 12 is mounted on a brake drum back plate 14 or on a bracket attached to the axle so that it is close to, on the order of 1/4 inch, transducer 8 when it passes by. A cable 16 carries signals generated by sensor 12 to a processing unit 18 which uses the sensor outputs to determine the pressure of air in tire 5. Processor 18 is coupled to a display unit 20 which provides visual and/or audible indications of tire pressure as desired.

With reference to FIG. 2 there is shown a detailed cross sectional view of transducer 8, of FIG. 1, according to the preferred embodiment. Transducer 8 includes an essentially non-magnetic hollow cylinder 22 having a portion of its inner surface threaded at each end. A pneumatic fitting 42 is threaded into one end of housing 22 forming an air tight seal except for an air passage 26 for connection to the air tube 10 of FIG. 1. A piston stop plug 28 is also threaded into the same end of housing 22 as plug 24. Plug 28 has hole 30 to insure that it does not form an air tight seal. A magnetic element 32 is fixed to plug 28 and is positioned so that its flux path is perpendicular to the drawing surface. A piston including a magnet carrier 34 and a rubber seal 36 is slidably positioned within cylinder 22. Carrier 34 has a magnetic element 38 fixed to it and positioned substantially the same as element 32. Rotation of magnetic element 38 is prevented by firm attachment of carrier 34 to a spring 40 which resists the movement of the piston in response to air pressure applied to it through plug 24. Another plug 42 is threaded into the other end of cylinder 22 and has one end of spring 40 firmly attached to it to prevent rotation of spring 40. Plug 42 also carries a third magnetic element 44. The magnetic flux path of element 44 is held substantially perpendicular to the plane of the figure by plug 42 but the element 44 is movable axially by adjustment of screw 46 against which it is held by a spring 48. This adjustment feature allows an initial adjustment of the spacing between elements 32 and 44 to correct for the nonuniform values of spring constant in springs such as spring 40. If very uniform springs can be obtained then the adjustment is not necessary. Another plug 50 is threaded into the second end of cylinder 22 to hold screw 46 and to provide a substantially complete seal to dirt and water. Plugs 42 and 50 both have air passages so that the cylinder volume between elements 38 and 44 is at atmospheric pressure.

Also illustrated in FIG. 2 are distances labeled "t" and "T," the ratio of which is an indication of air pressure which is supplied to air passage 26. These labels are used because in operation the actual measurement is of time periods and not the corresponding distances.

The components comprising sensor 12 of FIG. 1 are also illustrated in FIG. 2 showing the relative positioning of a magnetic pickup 52 with respect to transducer 8. In operation the transducer 8 is actually rotated one quarter turn so that the flux lines from magnetic elements 32, 38, and 44 are in the plane of the figure. Pickup 52 is a commercially available differential or position sensing magnetic sensor comprising a pair of magnetoresistive elements 53 and 54 positioned as shown in FIG. 2. The elements 53, 54 are connected in series from a positive voltage supply, typically 12 volts, to ground with the intermediate junction 55 being used as a signal output. Junction 55 is coupled to the input of an operational amplifier 56, which in the preferred embodiment is included as a part of the sensor 12 of FIG. 1.

Input and feedback resistors 58 and 60 are included with amplifier 56 to set the gain of the amplifier. A resistor 62 coupled from junction 55 to the positive input of amplifier 56 and a capacitor 64, coupled from the positive input to ground, act as a filter to provide a dynamic bias for amplifier 56. This biasing arrangement insures a balanced and symmetrical output from amplifier 56. Amplifier 56 acts as a buffer for sensor 52 to reduce noise on the line coupling signals from sensor 12 to processing unit 18 in FIG. 1.

FIG. 3 illustrates two possible sets of output signals which are generated by sensor 12 when transducer 8 passes by it. The first signal 66 is labeled CW, or clockwise, to indicate that it corresponds to the transducer 8 moving to the right in FIG. 2 relative to sensor 12. As magnet 32 approaches sensor element 53 the field it generates causes the resistance of element 53 to decrease so that the voltage at junction 55 decreases. This causes the below average portion of section 33 of signal 66. As magnet 32 moves farther to the right so that it is directly between elements 53 and 54 it has the same effect on both elements 53 and 54 so that the output signal returns to its bias level. As magnet 32 moves on to the right its effect on elements 53 diminishes and it reduces the resistance of element 54 so that the voltage at junction 55 rises to its maximum represented by the peak of section 33 of signal 66. As transducer 8 continues moving to the right the movable magnet 38 also moves past sensor 12 and generates section 39 of signal 66, and then magnet 44 moves past sensor 12 and generates section 45 of signal 66. Signal sections 33, 39 and 45 are essentially identical each having an initial drop below bias level followed by a peak above bias.

Signal 68 of FIG. 3 is the output of sensor 12 which results from the movement of transducer 8 from right to left past sensor 12 in FIG. 2 as would happen if the tire were moved to the other side of the vehicle. The order of passage of magnets 32, 38, and 44 is reversed and the signal sections are also reversed in shape. Thus it is seen that section 45 of signal 68 begins with a positive peak and ends with a negative peak. Signal sections 39 and 33 are likewise reversed. As illustrated in FIG. 3, the time period $t$ is measured between the signal sections 33 and 39 generated by magnets 32 and 38 respectively regardless of whether these two sections are the first and second or the second and third in the time sequence of signals. Also illustrated is the time period T which is the interval between movement of the magnets 32 and 44 past the sensor, regardless of the direction of motion. The use of these signals is explained in more detail below.

Figure 4:
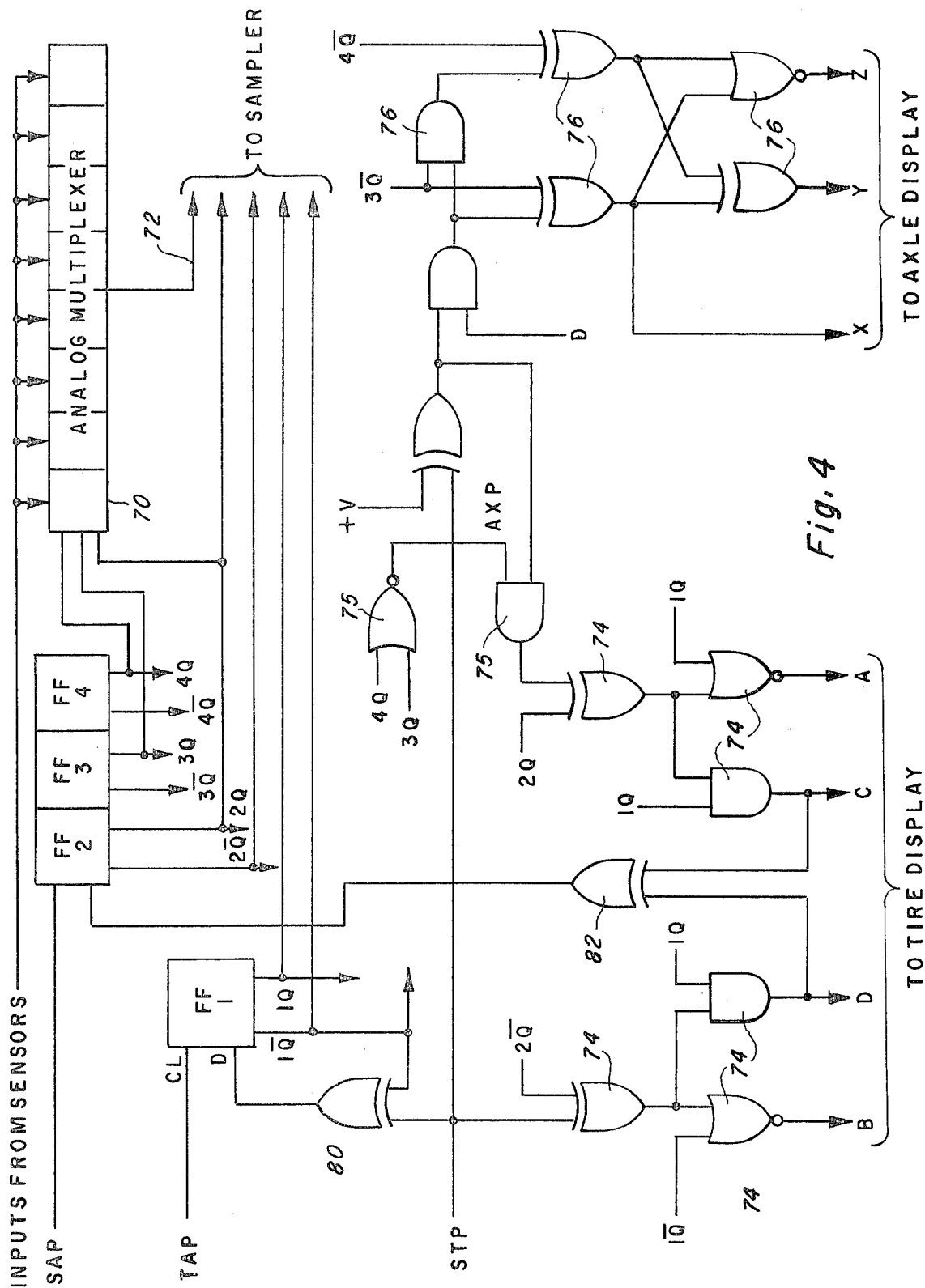
FIG. 4 is a logic diagram of a sensor signal sequencer.

FIG. 4 illustrates an input portion of the processing unit 18, FIG. 1 which sequentially couples the outputs of a plurality of sensors such as sensor 12 to the arithmetic portion of unit 18. While FIG. 1 illustrates one transducer 8 on one wheel 5 and a single sensor 12, the system design will accommodate any number of axles in any arrangement of single wheel or dual wheel axles for a truck with or without a trailer. On dual wheels, two transducers, such as transducer 8, are mounted diametrically opposite each other on the inside wheel. Only one sensor is used per wheel even if it has two transducers, and the single sensor detects both transducers. On a four axle truck there are eight sensors each having its own output buffer amplifier such as amplifier 56 of FIG. 2. In order to be specific, FIG. 4 shows a four axle arrangement with the first axle assumed to carry single wheels and the rest dual wheels. This arrangement is illustrative only. An eight channel multiplexer 70 has eight analog inputs, each coupled to the output of a sensor amplifier. Multiplexer 70 has one analog output 72 to which it couples one of the analog input signals which it receives, in response to control inputs received from flip flops labeled FF2 through FF4 which are connected in ripple through counter arrangement. The digital states of a FF1 an FF2 are detected by logic gates 74 which generate four output signals labeled A, B, C, and D indicating which tire on an axle is being checked, with A being the leftmost and D the rightmost tires. For simplicity in the schematic diagram the interconnections between flip flops FF1 through FF4 and other circuitry such as gates 74 are indicated by labeling outputs and inputs instead of actually drawing all interconnecting leads. The digital states of flip flops FF3 and FF4 are detected by logic gates 76 which generate three output signals labeled X, Y, and Z. These signals form a binary code which designates the axle on which a tire is being checked. Flip flop outputs 3Q and 4Q provide information through gates 75 to gates 74 that the first axle has only two tires and not four as do the remaining axles in this example. If other axles had only two tires, the necessary control signals would be derived from the flip flops in similar fashion. The circuitry of FIG. 4 also receives the signals SAP (sensor advance pulse) and TAP (transducer advance pulse) from FIG. 7 and the signal STP from FIG. 6. As is explained further below the SAP and TAP pulses occur after each sample is taken and displayed and cause the sequencer to go on to the next sensor and/or transducer as is appropriate. The SAP signal is blocked by the output of a gate 82 whenever the last sample taken was the first of two on a dual tire assembly. Both the SAP and TAP signals are blocked by the STP signal which occurs when the last sample taken was below a preset minimum value. In this way a bad sample will be checked repeatedly until a good reading occurs or a manual override signal is received as will be explained further below.

With reference now to FIG. 5 there is shown a schematic diagram of a sampler unit which receives the analog outputs from multiplexer 70 of FIG. 4 and provides digital output pulses which have widths equal to the time periods T and t used by the arithmetic unit to determine air pressure. Operation of this sampler may be better understood by further description of the signals which it receives with reference to FIG. 3. As described above the time period t occurs between the first two sensor outputs for the clockwise rotation illustrated by curve 66, and between the second and third outputs for the counterclockwise rotation illustrated by curve 68. In this preferred embodiment there are two transducers per wheel, but only one sensor. To allow separation of the outputs of the two transducers, the magnetic elements 32, 38, and 44, FIG. 1 are reversed in the second transducer of each wheel. The result of this reversal is that the waveform for the second transducer looks like wave form 68, FIG. 3 but the time period t still occurs between the first and second pulses. Considering a wheel, single or dual, on the left hand end of an axle and rotating clockwise as viewed from the sensor, the magnetic reversal results in two pressure samples which are separated by two consecutive pulses of the same polarity. Each sample consists of three bi-polar signals as shown, but this polarity reversal provides the needed information to allow the logic circuitry of FIG. 5 to "look" at only those three generated by a single transducer at one time. If the wheel has one tire, the second sample is a "dummy" sample and is used only to electronically define the first sample; it is not processed or displayed. If the wheel has two tires, both samples are used.

In this preferred embodiment the above described wheel having two oppositely polarized transducers may be placed on either end of an axle and therefore may rotate in either direction in normal operation of the vehicle. As was illustrated in FIG. 3, the reversal of rotation direction not only inverts the signal waveshape but it also changes the positions of the time period t to the time between the second and third pulses of the three pulse train. The logic of FIG. 5 can still distinguish the outputs corresponding to the two different transducers as it does for clockwise rotation and, with an additional input indicating which way the wheel is rotating, it can measure the appropriate time period corresponding to t. The additional input is provided by FF2 in FIG. 4.

With reference again to FIG. 5 there is shown the circuitry for performing these functions. An input 84 is coupled to the output 72 of the multiplexer 70, FIG. 4. Input 84 is connected to a filter comprising a resistor 86 and a capacitor 88 which provides a filtered output of junction 90 corresponding to the average value of the analog input at 84. Junction 90 is coupled through a resistor 92 to the positive input of a zero crossing detecting amplifier 94. Junction 90 is also connected to a resistive divider comprising fixed resistors 96 and a variable resistor 98. Resistors 96 and 98 provide positive and negative clipping voltage levels to inverting and noninverting inputs 100 and 102 of polarity detecting amplifiers 104 and 106 respectively. Input 84, is coupled, without filtering, through resistors 108, 110, and 112 to the remaining inputs of amplifiers 104, 106, and 94 respectively. The portion of FIG. 5 which has thus far been described converts the analog input signals into digital pulses. An output 114 of amplifier 104 is a positive pulse having a width equal to the time when the analog input at 84 is above a positive clip level set by resistors 96 and 98. Likewise, an output 116 of amplifier 106 is a positive pulse having a width corresponding to the time that the analog input at 84 is below a negative clip level set by resistors 96 and 98. An output 118 of amplifier 94 is positive whenever input 84 is above its average level and negative when it is below its average level. The transitions of the output 118 from one state to the other are used by the logic of FIG. 5 to start and stop the measured time periods.

Amplifier outputs 114 and 116 are coupled through capacitors 119 and inverters 120 to the set and reset inputs respectively of a flip flop 122, which changes state at the trailing edge of the positive input pulses to capacitors 119. An AND gate 124 receives three inputs: the Q output of flip flop 122; output 114 of amplifier 104; and the Q output of FF1 of FIG. 4. When two consecutive positive peaks are received at input 84, AND gate 124 provides a positive pulse at its output. AND gate 126 likewise receives three inputs: the $\overline{Q}$ output of flip flop 122; output 116 of amplifier 106; and the $\overline{Q}$ output of FF1 of FIG. 4. When two consecutive negative peaks are received at input 84, AND gate 126 provides a positive pulse at its output. The outputs of AND gates 124 and 126 are both connected to inputs of an OR gate 128, which has an output connected to the set input of a flip flop 130.

An AND gate 132 has four inputs: the $\overline{Q}$ output of flip flop 122; the $\overline{Q}$ output of FF1 of FIG. 4; the output 118 of amplifier 94 inverted by an inverter 134; and, the output of an OR gate 136. AND gate 132 provides an output pulse when there is a positive slope zero crossing at input 84 and an input having positive slope crossings is being measured. In similar fashion an AND gate 138 has four inputs; the output of OR gate 136; the output 118 of amplifier 94; the Q output of FF1 of FIG. 4; and the Q output of flip flop 122. AND gate 138 provides an output pulse when there is a negative slope zero crossing at input 84 and an input having negative slope crossings is being measured. The outputs of both AND gates 132 and 138 are connected to the inputs of an OR gate 140 which has an output connected to the clock input of flip flop 130.

The $\overline{Q}$ output of flip flop 130 is connected to the clock input of a flip flop 142 which also has a $\overline{Q}$ output coupled to the clock input of another flip flop 144, all in ripple through counter configuration. The Q output of flip flop 144 is coupled to the reset inputs of flip flops 130 and 142 to prevent counting by them until a reset signal SYR is received on line 146 from the control unit to be described below with reference to FIG. 7. The outputs of flip flops 130 and 142 of FIG. 5 and FF2 of FIG. 4 are decoded by AND gates 148 and 150 and OR gate 152 to provide a pulse having a width equal to the time period $t$, as shown in FIG. 5, which is used by the arithmetic unit as explained below. The $\overline{Q}$ output of flip flop 142 is equal to the T time period. OR gate 136 receives the Q outputs of flip flops 130 and 142 as inputs to generate an output labeled TIG, meaning total interval gate, which is also used by the arithmetic unit. An AND gate 154 receives the Q and $\overline{Q}$ outputs of flip flops 130 and 142, respectively, as inputs to provide an output labeled SCG, meaning scaling gate, for use by the arithmetic unit.

FIG. 6 illustrates the arithmetic unit which is part of the processing unit 18 of FIG. 1. The purpose of this unit is to make the actual calculation of tire pressure in pounds per square inch. The essential inputs from which the calculation is made are the time intervals $t$ and $T$ illustrated in FIG. 3 which are converted to digital pulses by the circuitry of FIG. 5. The calculation is simply the solution of the equation:

$$p = R(t/T) - L,$$

where $p$ is pressure; $t$ and $T$ are defined above; R is a constant equal to the product of the spring constant of transducer spring 40 and the distance between magnetic elements 32 and 44; and $L$ is a constant equal to the product of the spring constant of transducer spring 40 and the distance between magnetic elements 32 and 38 at zero pressure. It is apparent that this simple equation can be solved by a number of special purpose processors or by programmed devices such as microprocessors. Since no particular form of processor is essential to the present invention, the preferred unit is illustrated by the general block diagram of FIG. 6. The sequence of operation during a computation is as follows: First the resolution of the computation is established by choosing a suitable frequency with which to quantize the intervals T and $t$ since otherwise the quantization, and the register capacity, would be unnecessarily large at low vehicle speeds. Then the product R$t$ is formed in an accumulator during the interval $t$. When interval T is complete and the corresponding count is in a T register, the quotient R$t$/T is formed by iterated subtraction of T from R$t$, the quotient being the number of overflow pulses from the accumulator. Thus far the operations are in the binary number system. The overflow pulses are counted by a "D" or data register which counts in the binary decimal system and which has been preset to C+1-L where C is the register capacity and L was defined above. Thus the pressure "p" stands in the data register in BCD, binary coded decimal, form.

As with essentially all digital processors a clock 200 provides a time base for the arithmetic unit of FIG. 6. The clock 200 output is connected to an input of a scaler 202 which either passes the same clock frequency to its output or divides the clock signal and provides a lower frequency at its output. Selection of output frequency is made by counting output pulses of clock 200 during the SCG, scaling gate, interval generated by gate 154 of FIG. 5. If the count exceeds a preselected limit then scaler 202 provides a lower frequency output. In this way overflows in the rest of the circuitry are avoided at low vehicle speeds.

A block 204 labeled RPG, for read pulse generator, provides a series of pulses to an accumulator 212 following each clock pulse which serially read the contents of a selected register into the accumulator, stage by stage.

The output of scaler 202 is connected to a counter 208, labeled the T register, which sequentially counts the number of clock pulses it receives from scaler 202. The clock pulses are gated by scaler input T from FIG. 5. An R register 210 is a read only memory which is preset to the number R defined above with respect to equation (1). During the multiply operation, gates 206 are switched to R register 210 by a multiply signal, MUL, 254 from FIG. 7. The RPG unit 204 receives the $t$ input from FIG. 5 and produces a read cycle for each clock pulse received from scaler 202 during the $t$ interval. Each read cycle adds the contents of R registers 210 into accumulator 212. Thus at the end of the "$t$" interval a quantity proportional to R$t$ is in accumulator 212. At the end of the T interval a quantity proportional to T is in the T register 208. After the T interval the gates 206 are switched to couple the ones complement of the contents of the register 208 to the accumulator 212 by a divide signal, DIV, 250 from FIG. 7. The quantity R$t$ is then divided by T by the process of sequential substraction. The 1's complement of the number in register 208 is added to the number in accumulator 212, which is equivalent to substraction as is well known in the art. The RFG unit 204 provides a sequence of pulses to couple the quantity T to register 212 one bit at a time. This sequence of pulses produces one subtraction step. The number of subtraction steps is determined by the number of clock pulses received by the RPG unit 204 during the DIV input 250. An output 214 of accumulator 212 provides a pulse each time an overflow occurs in accumulator 212. The overflows occur during the subtraction steps. Output 214 is coupled to an input of a register 216 which counts the number of received pulses. When the total value in accumulator 212 is less than the number in the T register 208, the subtractions stop and the number in register 216 equals the pressure in the sample tire less the round off error.

The number in register 216 is coupled to a decoding unit 218 which in turn drives a digital readout 220. The pressure is thus displayed for the operator of the vehicle. At the same time a decoder 222 receives the tire location signal A, B, C, and D and the axle location signals X, Y, and Z from FIG. 4 and drives a display 224 indicating which tire is being measured. In the preferred form display 224 has one light emitting diode for each tire arranged in a pattern corresponding to the actual tire locations. The output of register 216 is also coupled to a comparator 226 which receives a second input from a low pressure selection unit 228. In preferred form unit 228 comprises two thumbwheel switches which are set by the vehicle operator to a minimum acceptable tire pressure. Unit 228 also has digital encoders to convert the pressure to the same digital code as register 215, which is binary coded decimal in the preferred embodiment. If the pressure in register 216 is less than that set in unit 228 at the end of a measurement cycle, comparator 226 generates a pulse on an output line 230. Output 230 is coupled to a flip flop 232 through an AND gate 229 when a CMP signal is received from FIG. 7. Flip flop 232 indicates an alarm condition when it receives a pulse. An output 234 of flip flop 232 is coupled to FIG. 4 as the STP signal which prevents the sequencer from going on to another tire location. In this way a tire showing low pressure will be checked repetitively. An input 236 to flip flop 232 is provided for resetting the flip flop manually by the operator so that conditions of other tires may be checked.

Figure 7:
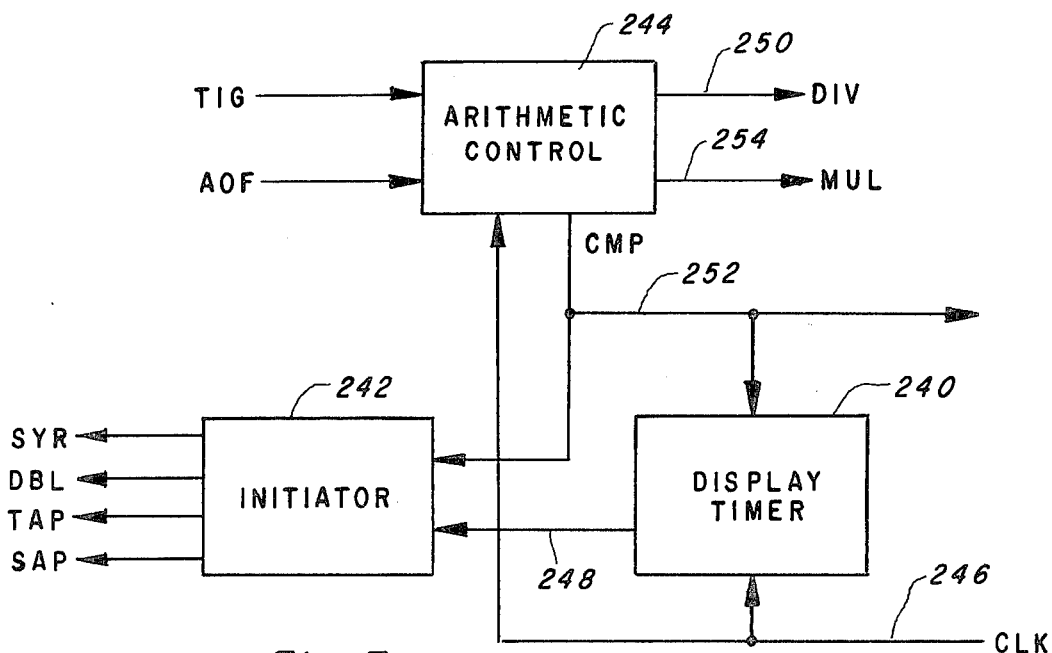

FIG. 7 illustrates control elements necessary to make the rest of the system operate in proper order. These elements include a timer 240, an initiator 242 and an arithmetic controller 244. Timer 240 has an input 246 connected to the output of clock 200 of FIG. 6. Timer 240 counts clock pulses and generates a pulse on an output 248 after a preselected time interval during which a previous pressure measurement was displayed. Timer 240 starts counting when it receives a CMP, compare, pulse from controller 244. Timer 240 also puts out a pulse on line 248 after a longer time interval during which no CMP pulse is received. This initiates a system reset if no sample is received within a prescribed time due to excessively low speed of the vehicle or a malfunctioning transducer. Initiator 242 receives the output pulses from timer 240 and starts a measurement cycle by generating four output pulses, SYR, DBL, TAP and SAP. The SYR pulse is coupled to: the reset input of flip flop 144 of FIG. 5; and to accumulator 212, register 208, and register 216 of FIG. 6. The DBL pulse is coupled to displays 220 and 224 of FIG. 6 to blank them while a sample is being processed. The TAP and SAP pulses are coupled to FF1 and FF2 respectively of FIG. 4. In response to these signals the circuitry of FIG. 4 selects a new transducer and a new sensor if appropriate; the circuitry of FIG. 5 takes the next available sample from the selected transducer; and the circuitry of FIG. 6 is ready to calculate pressure from the sample. Controller 244 of FIG. 7 receives the TIG, total interval gate, pulse from FIG. 5. During this interval Controller 244 generates a multiply signal, MUL, on output 254 which selects the appropriate register and produces the product Rt in accumulator 212. Also during this interval the T register of FIG. 6 counts the T interval. At the end of TIG the controller generates a divide signal, DIV, on output 250 connected to gates 206 of FIG. 6, which couples the ones complement of the contents of registers 208 to accumulator 212. As explained above each, except the last, subtraction cycle generates an overflow pulse, labeled AOF, on line 214 which is also coupled to controller 244, FIG. 7. In response to each overflow pulse, a controller 244 continues the DIV signal which causes another subtraction cycle. When the contents of accumulator 212 is less than the contents of register 208 no overflow pulse occurs. Controller 244 responds to the end of the overflow pulses by terminating DIV and generating a CMP, compare pulse on line 252. The CMP pulse is coupled to timer 240, initiator 242, and to AND gate 229. In addition to starting a new display time interval in timer 240 the CMP pulse couples the output of comparator 226 to flip flop 232 and terminates blanking signal DBL, causing the last sampled pressure and the corresponding wheel location to be displayed.

This cycle generated by FIG. 7 repeats indefinitely unless an alarm condition is set in flip flop 232. In that case the STP signal on line 234 inhibits FF1 and FF2 of FIG. 4 to prevent selection of a new tire. The same tire is then sampled repeatedly until the alarm flip flop is manually reset.

While the present invention has been shown and illustrated by way of specific apparatus it is apparent that additions and modifications can be made. For example, the magnetic elements in the transducer could be replaced by a non-magnetized, ferrous material such as soft iron if signal to noise ratios permit reduced sensor outputs and increased amplifications as some applications might permit. Other parts of the transducer would be of non-ferrous materials. Instead of mounting the transducers on the rim, they could be mounted on two brackets which attach to the outside of the brake drum at diametrically opposite points and extend inward through the clearance gap between the drum and the rim. The transducer would be carried on the ends of the brackets in the same orientation as previously described. This has two advantages (a) the transducers would not be subject to damage when changing tires on a rim or from rough handling of a spare tire and (b) the system could be simplified since a given transducer no longer must operate on either side of the vehicle and in a reversed sense of rotation. The pressure samples could be compared against a high as well as a low limit. Other additions and modifications can be made within the scope of the invention as defined by the appended claims.

I claim:

1. An air pressure measuring system for measuring the pressure of air in a tire on a moving vehicle comprising:

an air pressure transducer mounted on a wheel, said transducer comprising a tubular housing having a first end in communication with the interior volume of a tire on said wheel, a piston slidably positioned within said tubular member, a spring between said piston and a second end of said tubular member, first and second magnetic elements fixed to the first and second ends of said tubular member respectively and a third magnetic element fixed to said piston to move therewith, a magnetic sensor mounted on a vehicle and spaced from the path of rotation of said air pressure transducer, said sensor having an output for providing signals in response to movement of said first, second and third magnetic elements past said sensor, and electronic processing and display means coupled to said sensor output for measuring the time intervals between passage of said first, second, and third magnetic elements past said sensor, for calculating air pressure from said time intervals, and for visually displaying said air pressure.

2. An air pressure measuring system according to claim 1 wherein the electronic processing means measures a first time interval beginning when said first magnetic element moves past said sensor and ending when said second magnetic element moves past said sensor, and a second time interval beginning when said first magnetic element moves past said sensor and ending when said third magnetic element moves past said sensor, divides the second time interval by the first time interval to generate a ratio, multiplies the ratio by a first preselected constant, subtracts a second preselected constant from the product, and provides the result to said display means as an indication of air pressure.

3. An air pressure measuring system according to claim 1 further including:

a plurality of additional air pressure transducers mounted on a plurality of additional wheels on the same vehicle, a plurality of additional magnetic sensors mounted on the vehicle and positioned to sense the movement of magnetic elements in said additional transducers past said additional sensors, and electronic sequencing means having inputs connected to each of the sensors on said vehicle and having an output coupled to said electronic processing and display means for sequentially coupling each of said sensor outputs to said processing and display means.

4. An air pressure measuring system according to claim 3 further including:

wheel position indicating means coupled to said sequencing means having an output for providing an indication of the location of sensor being coupled to the processing and display means, and location display means coupled to said wheel position indicating means for providing a visual display of the location of the sensor being coupled to said processing and display means by said sequencing means.

5. An air pressure measuring system according to claim 1 further including:

a low pressure alarm means coupled to said electronic processing and display means for comparing the calculated air pressure to a preselected minimum acceptable value and for providing an audible output signal when said calculated value is less than said minimum value.

* * * * *